Sept. 7, 1937.  M. OLLEY  2,092,611

AUTOMOBILE SUSPENSION SYSTEM

Filed Oct. 2, 1933

Inventor
Maurice Olley

By Blackmore, Spencer & Flint
Attorneys

Patented Sept. 7, 1937

2,092,611

UNITED STATES PATENT OFFICE 2,092,611

AUTOMOBILE SUSPENSION SYSTEM

Maurice Olley, Pleasant Ridge, Mich., assignor to General Motors Corporation, Detroit, Mich., a corporation of Delaware Application October 2, 1933, Serial No. 691,745

15 Claims. (Cl. 280—124)

This invention relates to a vehicle suspension system of the type in which a bearing member or supporting bracket for a road wheel is pivotally connected to one or more supporting link members extending between the bearing member and the vehicle frame and providing for a vertical displacement of the frame and the bearing member relatively to one another.

It relates particularly to such a suspension system for the dirigible road wheels of a motor vehicle in which a pair of supporting link members are vertically spaced, extending laterally from the frame of the vehicle with pivotal connections to the frame and to spaced points of means including a knuckle bracket and a king pin for the support of a dirigible road wheel in order to form a trapezoidal pivotal linkage system in which the members are capable of pivoting about one another in a substantially vertical plane with means resiliently restraining such motion.

As usually constructed, there is difficulty in keeping the pivotal connections free from rattle as a result of wear and the variations normally permitted in frame manufacture are such that it is difficult to get the king pins for the dirigible wheels on opposite sides of the frame properly aligned with the correct and identical caster angle.

One object of the invention is to provide a pivotal linkage support of the foregoing type with suitable link pins of the threaded type in which a threaded pin is passed through an "eye" on one member and the jaws of a yoke or shackle like end on the other member, being screwed in one or both members and held against rotation in one member while the other member is capable of the required oscillating motion on the threaded part.

Another object of the invention is a means of adjusting the inclination to the vertical of the knuckle bracket as measured in a plane parallel with the longitudinal axis of the vehicle in order to obtain the requisite "caster angle" of the king pin.

The above and other objects of the invention will be apparent as the description proceeds.

Threaded bearings for the angular oscillation of the link connections have known advantages of increased bearing and wearing surface area and any end thrust thereon is taken by the sides of the threads.

The drawing shows the application of the invention to a construction in which the transverse swinging support links are V-shaped in plan with the point of the V connected to the knuckle bracket and the spaced apart legs thereof suitably pivoted to the frame of the vehicle.

Figure 1:
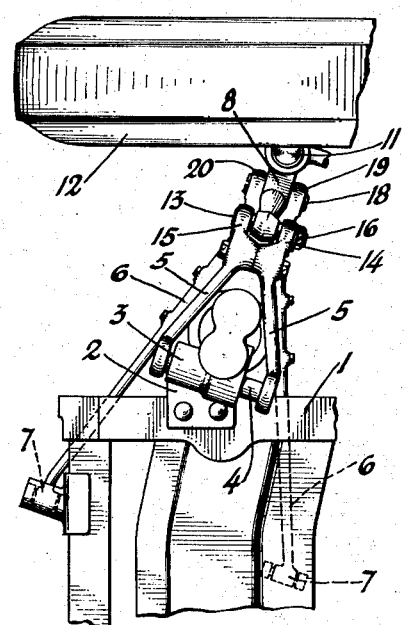
Figure 1 is a plan view of one dirigible wheel and its mounting.
Figure 2:
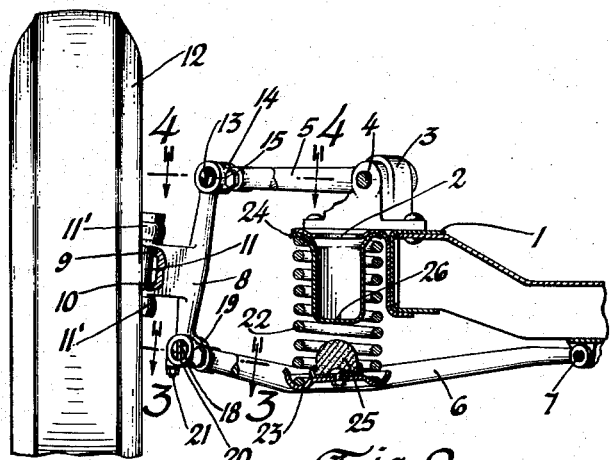
Figure 2 is a part sectional elevation of Figure 1.
Figure 3:
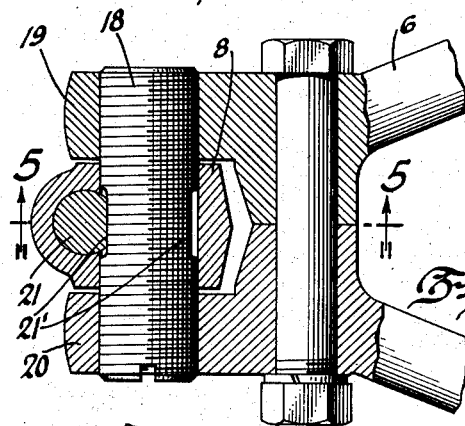
Figure 3 is a part section on line 3—3 of Figure 2 showing the link pin connection between the knuckle bracket and the lower support link.
Figure 4:
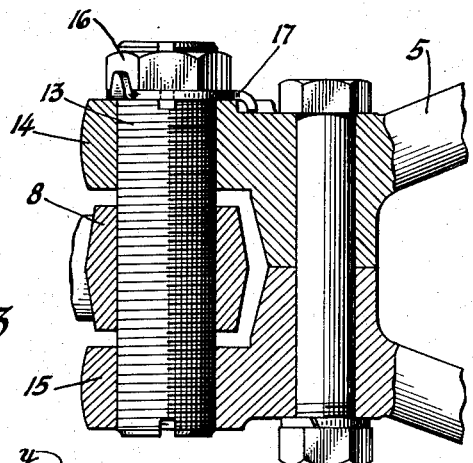
Figure 4 is a part section on line 4—4 of Figure 2 showing the link pin connection between the knuckle bracket and the upper support link.
Figure 5:
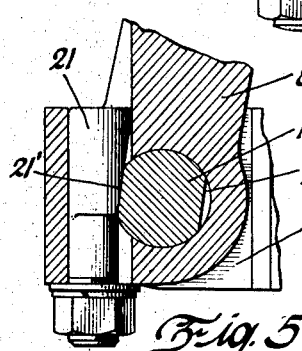
Figure 5 is a part section on line 5—5 of Figure 3 showing the means of locking the pin to the knuckle bracket.

1 is the frame of the vehicle having an outrigger 2 rigidly fixed thereto.

Rigidly fixed to the outrigger 2 is a shock absorber 3 of hydraulic type, having an actuating spindle 4 to which the upper support link 5—V-shaped in plan—has its spaced apart legs keyed or otherwise suitably fixed.

The lower support link 6—V-shaped in plan—has its spaced apart legs pivoted about screw threaded pins 7 fixed to the frame 1.

Pivotally attached to the ends of the supporting links at the point of the V is the wheel supporting means which is a knuckle bracket 8 having bearings 9 and 10 for the king pin 11 to which the spindle forging 11' of wheel 12 is secured.

The upper pivotal attachment of the knuckle bracket 8 to the support link 5 consists of a pin 13 screw threaded in the knuckle bracket 8 and in the jaws 14 and 15 of the forked end of the link 5. The space between the jaws 14 and 15 is greater than the thickness of the knuckle bracket in order to provide for various positions of the knuckle bracket, relative to the fork,—axially of the pin 13. The pin 13 is locked in the forked end of the link 5 by the nut 16 and lock washer 17.

The lower pivotal attachment of the knuckle bracket 8 to the support link 6 consists of a pin 18 screw threaded through the knuckle bracket 8 and in the jaws 19 and 20 of the forked end of the link 6. The pin 18 is locked in the knuckle bracket 8 by the tapered cotter pin 21 engaging flats 21' on the pin.

The positioning of the knuckle bracket 8 in the jaws 14 and 15 relative to the fork of link 5 axially of pin 16 is effected by screwing the pin through one of the jaws to an extent equal to the distance required between the inner face of the jaw and the side of the knuckle bracket before starting the screwed pin in the threads of the knuckle bracket. It will be appreciated that, to change the inclination of the knuckle bracket and hence the caster angle of the king pin, the knuckle bracket can be sprung the requisite distance forwardly or rearwardly between the jaws 14 and 15, before the screwed pin is started in the threads of the knuckle bracket. In this way various positions of adjustment are obtainable in steps equal to the pitch of the thread.

Figure 6:
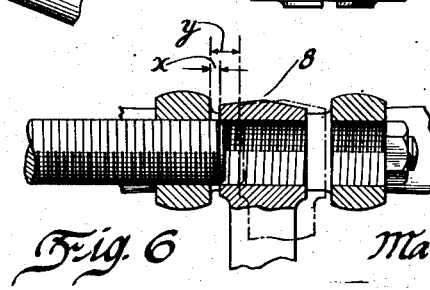
Figure 6 is a part sectional view illustrating the method of effecting an adjustment of the position of the knuckle bracket relatively to the forked end of the upper support link axially of the link pin.

Figure 6 shows the threaded pin being started in the knuckle bracket 8 a distance $x$ away from the inner face of one of the jaws of a forked end, while the dotted lines show the knuckle bracket in another position of adjustment a distance $y$ equal to $x$ plus twice the pitch of the thread from the last position.

The frame 1 is resiliently supported from the road wheel through the coil spring 22 having a seating 23 on the link 6 and a seating 24 on the outrigger 2. A rubber cushion 25 on seating 23 coacts with a stop 26 to limit the compression under deflection of spring 22. It will be apparent that the invention is equally applicable to a suspension in which resilient links which may consist of leaf springs anchored to the frame are employed in place of the rigid links 5 and 6 illustrated in the drawing.

I claim:

1. In a vehicle suspension system, a frame, support links extending laterally therefrom, a knuckle bracket for a dirigible road wheel, a king pin in the knuckle bracket, pivotal connections including link pins between the knuckle bracket and each of the support links at spaced points on the knuckle bracket, and means enabling an adjustment of the relative positions of the knuckle bracket and one of the support links axially of their link pin whereby the caster angle of the king pin may be varied.

2. In a vehicle suspension system, a frame, laterally extending and vertically spaced support links pivoted thereto, a knuckle bracket for a dirigible road wheel, a king pin in the knuckle bracket, pivotal connections including screw threaded link pins between the knuckle bracket and each of the support links at spaced points on the knuckle bracket, and means enabling an adjustment of the positions relatively to one another of the knuckle bracket and one of the support links, axially of their link pin whereby the caster angle of the king pin may be varied.

3. In a vehicle suspension system of the swinging support arm type in which a road wheel is resiliently supported independently of the other road wheels through a trapezoidal pivotal linkage system having two vertically spaced arms connected to spaced points of the vehicle frame, a pivotal connection between one of the arms and the frame consisting of the operating spindle of a shock aborber bolted to the frame, the arm being keyed to the operating spindle, and screw threaded link pins for the remainder of the pivotal connections of the trapezoidal pivotal linkage system.

4. In a vehicle suspension system of the swinging support arm type in which a road wheel is resiliently supported independently of the other road wheels through a trapezoidal pivotal linkage system, having a pair of vertically spaced arms, pivotal connections including screw threaded link pins between the road wheel and the vertically spaced arms, a pivotal connection between one of the arms and the vehicle frame, consisting of the operating spindle of a shock absorber bolted to the frame, the arm being keyed to the operating spindle, and means resiliently restraining pivotal movement about the threaded link pins consisting of a coil spring between one of the arms and a part rigid with the vehicle frame.

5. In a vehicle suspension system, a frame, laterally extending and vertically spaced support links pivoted thereto, a knuckle bracket for a dirigible road wheel, a king pin in the kunckle bracket, pivotal connections including screw threaded link pins between the knuckle bracket and each of the support links at spaced points on the knuckle bracket, whereby the relative positions of the knuckle bracket and one of the support links axially of their link pin may be adjusted to vary the "caster angle" of the king pin.

6. In a vehicle suspension system, a frame, support links extending laterally therefrom, means pivotally connected to the support links for pivotal movement relative thereto in a substantially vertical transverse plane, said means including a knuckle bracket and a king pin for the support of a dirigible road wheel, and means enabling an adjustment of the angular inclination of the knuckle bracket relatively to the support links, in a substantially vertical plane parallel to the longitudinal axis of the vehicle whereby the caster angle of the king pin may be varied.

7. A joint for mounting and castering a vehicle wheel of the individually sprung type, comprising link means adapted to be connected to the frame of the vehicle for pivotal movement in a substantially vertical plane, spaced and apertured arms on the free end of the link means, a wheel mounting and castering member between the arms and having a threaded aperture, a threaded pin extending through all of the apertures and having threaded engagement with the aperture in the mounting member, and means in the apertures in the arms threadedly engaging opposite ends of the pin.

8. In combination, a motor vehicle frame, a pair of links pivotally connected to the frame for pivotal movement in a substantially vertical plane, a front wheel mounting and castering member extending between free ends of the links, and means pivotally connecting the member to the links, said means including an adjustable connection between one link and the member for adjusting the castering angle of the member.

9. In combination, a motor vehicle frame, a pair of links pivotally connected to the frame for pivotal movement in a substantially vertical plane, a front wheel mounting and castering member extending between free ends of the links, and means pivotally connecting the member to the links, said means including a threaded member pivotally connecting one link and the wheel mounting member and on which one of the members is pivotally mounted by threaded engagement therewith.

10. In a vehicle suspension system, a frame, a support link extending therefrom, means pivotally connected to the support link for pivotal movement relative thereto in a substantially vertical plane, said means including a knuckle bracket and a king pin for the support of a dirigible road wheel, and adjustable means between the king pin and the support link, enabling an adjustment of the angular inclination of the king pin relatively to the support link, in a substantially vertical plane extending in a direction generally fore and aft of the vehicle, whereby the caster angle of the king pin may be varied.

11. In a vehicle suspension system, a frame, support links extending laterally therefrom, means pivotally connected to the support links for pivotal movement relative thereto in a substantially vertical transverse plane, said means including a knuckle bracket and a king pin for the support of a dirigible road wheel, and adjustable means between the king pin and one of the support links, enabling an adjustment of the angular inclination of the king pin relatively to the support links, in a substantially vertical plane extending in a direction generally fore and aft of the vehicle, whereby the caster angle of the king pin may be varied.

12. In a vehicle suspension system, a frame, a support link extending therefrom, supporting means for a dirigible road wheel pivotally connected to the support link for pivotal movement relative thereto in a substantially vertical plane, said supporting means providing a substantially vertical pivot axis for steering movement thereabout of a dirigible road wheel, and adjustable means between said pivot axis and the support link, enabling an adjustment of the angular inclination of the said axis relatively to the support link, in a substantially vertical plane extending in a direction generally fore and aft of the vehicle, whereby the "caster" angle of the said axis may be varied.

13. In a vehicle suspension system, a frame, support links extending laterally therefrom, supporting means for a dirigible road wheel pivotally connected to the support links for pivotal movement relative thereto in a substantially vertical transverse plane, said supporting means providing a substantially vertical pivot axis for steering movement thereabout of a dirigible road wheel, and adjustable means between said pivot axis and one of the support links, enabling an adjustment of the angular inclination of the said axis relatively to the support links, in a substantially vertical plane extending in a direction generally fore and aft of the vehicle, whereby the "caster" angle of the said axis may be varied.

14. In a vehicle in which the road wheels are independently suspended, a frame, a support link extending therefrom, road wheel supporting means pivotally connected to the support link, for pivotal movement relative thereto in a substantially vertical plane, and adjustable means between said road wheel supporting means and the support link, enabling an adjustment of the angular inclination of the said road wheel supporting means relatively to the support link, in a substantially vertical plane extending in a direction generally fore and aft of the vehicle.

15. In a vehicle suspension system, a frame, a support link extending therefrom, a supporting means for a dirigible road wheel pivotally connected to the support link, said supporting means being provided with a king pin constituting a pivot axis for steering movement of the dirigible road wheel, and adjustable means between said king pin and the support link, enabling an adjustment of the angular inclination of the king pin relatively to the support link, in a substantially vertical plane extending in a direction generally fore and aft of the vehicle, whereby the "caster" angle of the said king pin may be varied.

MAURICE OLLEY.